US008675259B2

United States Patent
Chapman et al.

(10) Patent No.: US 8,675,259 B2
(45) Date of Patent: Mar. 18, 2014

(54) DOUBLE LAYER GLOSSMARK IMAGE THROUGH DYNAMIC PATTERNINKS

(75) Inventors: Edward Chapman, Rochester, NY (US); Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 177 days.

(21) Appl. No.: 13/303,178

(22) Filed: Nov. 23, 2011

(65) Prior Publication Data

US 2013/0128317 A1    May 23, 2013

(51) Int. Cl.
*H04N 1/40* (2006.01)
(52) U.S. Cl.
USPC .......... 358/2.1; 358/3.06; 358/3.28; 358/450; 358/540
(58) Field of Classification Search
None
See application file for complete search history.

(56) References Cited

U.S. PATENT DOCUMENTS

| 5,234,783 | A * | 8/1993 | Ng | 430/45.53 |
| 7,324,241 | B2 * | 1/2008 | Eschbach et al. | 358/1.9 |
| 7,391,537 | B2 * | 6/2008 | Eschbach et al. | 358/3.06 |
| 7,580,153 | B2 * | 8/2009 | Eschbach et al. | 358/1.9 |
| 7,589,865 | B2 * | 9/2009 | Eschbach et al. | 358/1.9 |
| 2004/0000786 | A1 * | 1/2004 | Xu et al. | 283/113 |
| 2004/0001233 | A1 * | 1/2004 | Wang et al. | 358/3.06 |
| 2008/0192297 | A1 * | 8/2008 | Wang et al. | 358/3.06 |
| 2009/0097063 | A1 * | 4/2009 | Mizuno | 358/1.15 |
| 2009/0122349 | A1 | 5/2009 | Bala et al. | |
| 2010/0007902 | A1 * | 1/2010 | Kikuchi | 358/1.9 |
| 2010/0014120 | A1 * | 1/2010 | Nishiyama | 358/3.01 |
| 2010/0128321 | A1 | 5/2010 | Wang et al. | |
| 2010/0214595 | A1 * | 8/2010 | Chapman et al. | 358/1.15 |

\* cited by examiner

*Primary Examiner* — Dung Tran
(74) *Attorney, Agent, or Firm* — Fay Sharpe LLP

(57) ABSTRACT

A method for providing a double layer GlossMark™ image includes providing a first layer text string for generating a patternink. The method further includes providing a second layer text string through the patternink. The first layer text string is visible as gloss variation between first character and background fields and the second layer text string is visible as a color difference between second character and background fields.

17 Claims, 5 Drawing Sheets

DOUBLE LAYER GLOSSMARK IMAGE THROUGH DYNAMIC PATTERNINKS

BACKGROUND

The present disclosure is directed toward a method and an apparatus for providing a variable gloss image and, more particularly, to a double-layer GlossMark™ image that is rendered using a dynamic patternink.

In conventional applications, a font string or text is visually seen as a character/text element against a different colored background. In contrast, GlossMark™ font allows text to be visible as a difference in directional gloss and is obtained with no color difference between font foreground and background. This font has applications in security and beautification, etc., and is preferably implemented in a standard digital printing system. Therefore, GlossMark™ applications were created to provide font representations that can be handled in standard font mechanisms of a language. GlossMark™ font is an electronically stored font representation that includes a rendered foreground font character representation having a font body image shape and a background field area bitmap representation suitably encompassing the font body image shape. The bitmap representations are created for a specific input font and size. More specifically, a sub-sample of the font selection is rasterized into a binary bitmap form at a reduced resolution. The font selection undergoes upscaling to eliminate fine details of the font and to create a coarse representation of the font, which enables an alignment of all character outlines with a placement of anisotropic structures. A first anisotropic structure is applied to the foreground font character representation and a second anisotropic structure rotated from the first structure is applied to the background field. The resulting GlossMark™ font provides font elements and background fields formed from the same color, that are recognizable by gloss differentiation. Changes in the anisotropic structures are made viewable by a suitably angled concentrated light source, which is utilized as a tool assist in the gloss application. In this manner, differential gloss images can be employed as a differential gloss font in a variable data system without impacting a throughput of the image producing system.

Accordingly, GlossMark™ text finds useful implementation as a document security element in security applications. However, the use of the single color for forming GlossMark™ text strings has limited design freedom and it makes the text string more sensitive to machine artifacts and drifts when compared to a more visually complex pattern. Therefore, it is desirable to provide a dynamic visual distraction pattern that can be overlaid with the pattern ink so that distinct variable information can be seen in color and in gloss. In this manner, the artifacts may be concealed. However, the previously mentioned process for precomputing the bitmaps for the original GlossMark™ font is not achievable for the second independent variable entity that is overlaid on the first. The total amount of data required for processing and storing the various precomputed images would exceed reasonable limits.

Therefore, the present disclosure provides a method and an apparatus for providing a double layer GlossMark™ image through a use of dynamic patterninks.

INCORPORATION BY REFERENCE

This application is related to co-pending, commonly assigned U.S. Pub. No. 2010/0214595, filed Feb. 25, 2009, entitled "METHOD AND APPARATUS FOR USING PATTERN COLOR SPACE IN PRINT JOB PROCESSING", and naming Edward Chapman, et al. as inventors, and is incorporated herein by this reference in its entirety.

Cross reference is also made to U.S. Pat. No. 7,580,153, issued on Aug. 25, 2009, entitled "PRINTED VISIBLE FONTS WITH ATTENDANT BACKGROUND", by Reiner Eschbach, et al., the disclosure of which is incorporated by reference herein in its entirety.

Cross reference is also made to U.S. Pub. No. 2010/0128321, published on May 27, 2010, entitled METHODS AND SYSTEMS TO EMBED GLOSSMARK DIGITAL WATERMARKS INTO CONTINUOUS-TONE IMAGES, by Shen-Ge Wang, et al., the disclosure of which is incorporated by reference herein in its entirety.

BRIEF DESCRIPTION

Subject matter of the present disclosure is directed in one embodiment to a method for providing a double layer GlossMark™ image. The method includes providing a first layer text string for generating a patternink. The method further includes providing a second layer text string through the patternink. The first layer text string is visible as gloss variation between first character and background fields and the second layer text string is visible as a color difference between second character and background fields.

Another embodiment according to the present disclosure is directed toward a method for forming a double-layer gloss image. The method includes defining a patternink to include a first variable gloss layer data text string. The method further includes defining start position coordinates for rendering the patternink at an arbitrary location on an associated print media substrate. The method also includes using the patternink as a functional mask for pouring a second color layer through the mask.

Another embodiment of the present disclosure is directed toward an apparatus that is adapted to render a double layer gloss image. The apparatus includes a processor that is adapted to retrieve a gloss font representation. The processor is further adapted to generate a first text string using a series of gloss fonts of the retrieved font representation. The processor is further adapted to generate a patternink using the first text string for forming a first gloss layer. The processor is adapted to generate a second text string using a series of color fonts. The processor is adapted to write a second color layer over the first gloss layer by providing the second text string through the patternink. The apparatus further includes a memory for saving the patternink. The apparatus further includes a marking engine adapted to render the first gloss layer and the second color layer onto an associated print media substrate.

DETAILED DESCRIPTION

Figure 1:
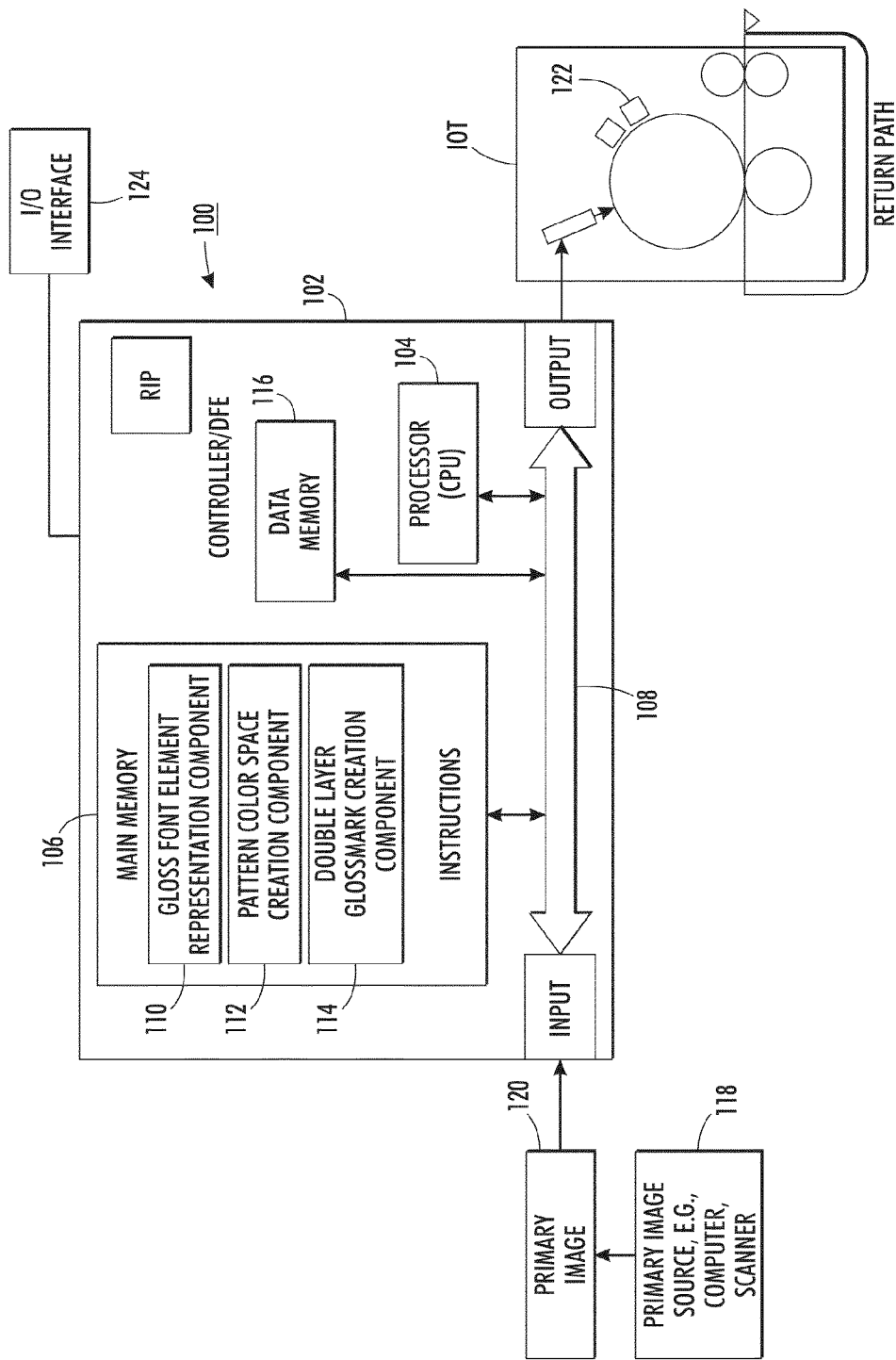
FIG. 1 is a functional block diagram of a system for generating a double layer GlossMark™ image on a substrate.

The present application is directed toward a method and an apparatus for providing a double layer GlossMark™ image, which is based on superimposed layers of variable text strings and wherein one text string includes a differential gloss characteristic. A technique disclosed herein creates an imaging effect using differential gloss characteristics of an image formed from multiple layers. At least one layer includes variable text strings that are discernable at one viewing angle and less discernable at a second viewing angle. The text strings are formed from a series of font elements that are each rendered using different anisotropic structures encapsulated as a single entry where the different anisotropic structures exhibit a differential gloss. In one embodiment, at least two superimposed layers each include variable text strings being discernable at different viewing angles, whereby the first text string is visible as a gloss variation between the characters and the background and the second text string is visible as a color difference between characters and background.

The present disclosure is more specifically directed toward a process for integrating GlossMark™ image and patternink applications in documents for providing a desired imaging effect. The disclosure is further directed toward an apparatus adapted to produce the imaging effect by rendering two variable text layers on a document. The document is a print media substrate that may be any two-dimensional material adapted to carry toner and/or ink (hereinafter collectively referred to as "toner") that is applied thereto using electronic, digital, xerographic, laser printing or other applicable methods.

GlossMark™ text, as it is described herein, refers to a differential gloss font representation that is produced from two anisotropic structures that are tessellated together. The GlossMark™ differential gloss image is achievable using portions of the image having different oriented anisotropic structures that can be, for example, created in the font design by using two anisotropic halftone screens. The halftone screens used in generating the differential gloss characteristic is provided by halftone structures (clusters) having similar sizes and shapes (for a given gray level) but different polarization directions. The halftone dot orientations are selected to be similar in density so that they equally diffuse and reflect incident light at orthogonal angles to the print media substrate, but they unequally reflect light at certain other angles. A degree of the difference in reflected light changes with the viewing angle. Techniques for generating differential gloss patterns in printed images are described, for example, in above-mentioned U.S. Pub. No. 2010/0128321, incorporated herein by reference.

More particularly, if the incident light is from directly above the document, the diffused light and the reflected light are typically equal at orthogonal angles to the document for the two halftone structures. In this way, the light which is available to a scanner or to the human eye from directly above is the same. However, the specular reflected light is considerably greater for one of the anisotropic orientations at a given off-normal angle. If as printed, a mass of the first orientation halftones are butted directly adjacent to a mass of the second orientation halftones, there is discernable a difference in reflected light between them, which will be perceived as gloss differential, or a differential gloss (GlossMark™) image, when viewed at from particular angles. The perceptibility of this gloss differential is generally maximized when the halftone anisotropic orientations are 90-degrees apart. In practice, the maximized differential is typically provided by screens at +45° and −45° from the printing (process) direction. For each dot location, the screen may comprise a grid of cells (pixels), each of which may be on or off. The dot may grow, with increasing gray level, from a single pixel or from multiple pixels. It will be appreciated that the anisotropy is most apparent at intermediate gray levels where at least some but not all the pixels are turned on. At high or low gray levels, where substantially all or none of the pixels are turned on, the anisotropy is diminished or absent.

A patternink, as it is discussed herein, is a pattern color space created from a variable portion that contains a first text string, where it is understood that 'text' in this context refers to any symbol or sequence of symbols that can be found in typefaces or fonts, including alphanumeric characters, icons, symbols and the like. In one embodiment, a first text string rendered as GlossMark™ text defines the patternink. In essence, rather than rendering a GlossMark™ text to a page or paper, the GlossMark™ text string is rendered into a memory structure that can be used as a tile for subsequent imaging. Techniques for generating differential gloss patterns in printed images are described, for example, in above-mentioned U.S. Pub. No. 2010/0214595, incorporated herein by reference.

Furthermore, the patternink and double layer Gloss-Mark™ image provided herein may be stored as a digital image data file to be rendered by the same or a different image forming apparatus or device from that device used for creating the digital image file. For example, the double gloss layer image data file may be stored for later rendering on an image forming apparatus that does not have software for creation of differential gloss images. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

Figure 2:
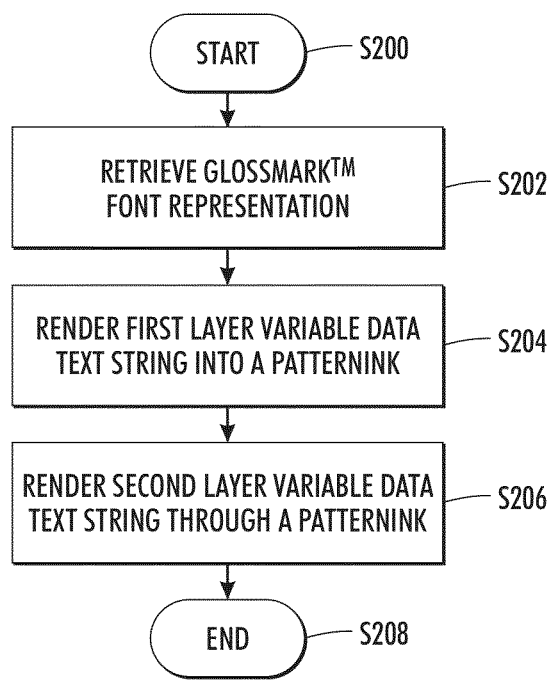
FIG. 2 is a flowchart depicting an overview of an exemplary method embodiment according to the disclosure.
Figure 4:
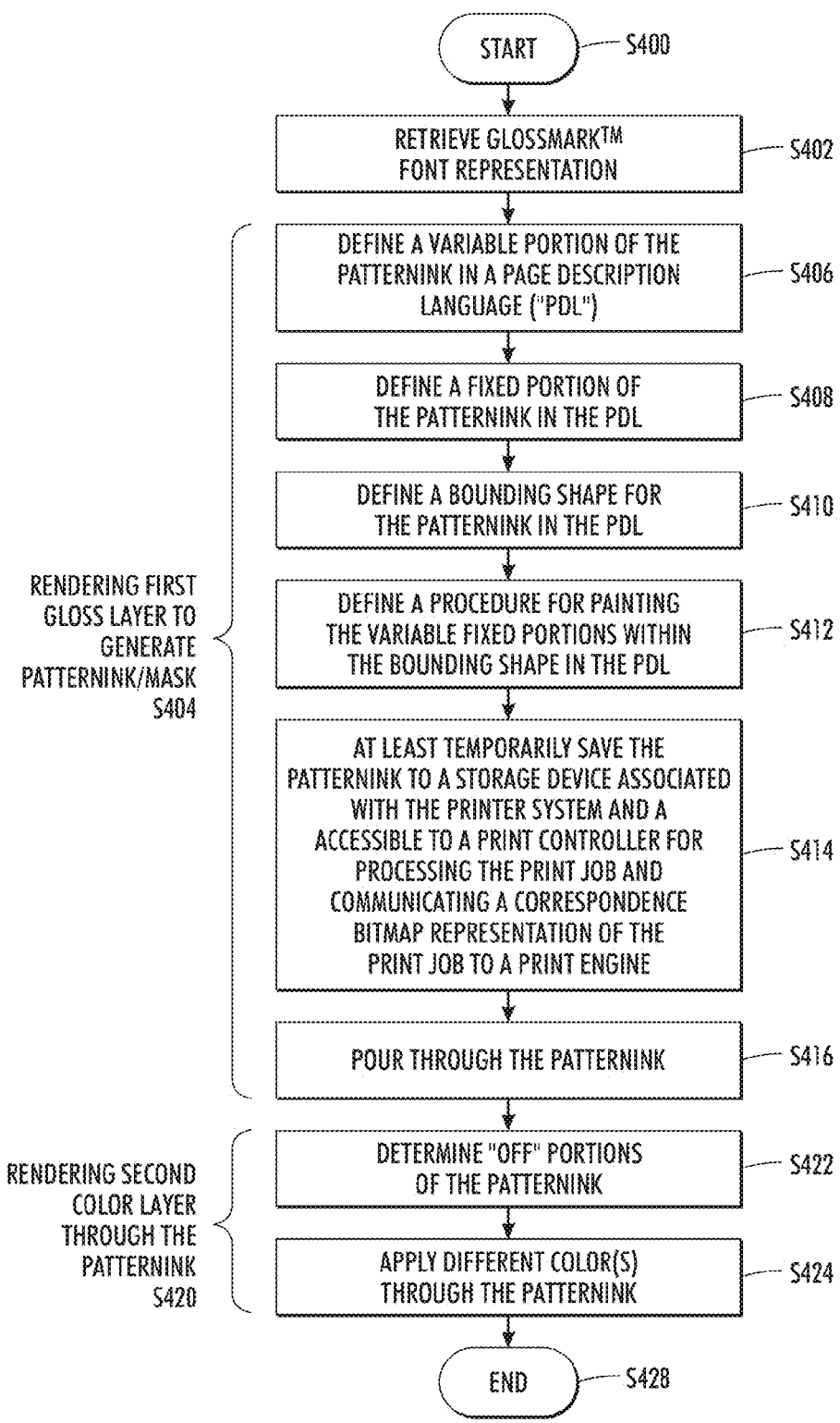
FIG. 4 is a flowchart depicting the method according to the disclosure.

The method illustrated in FIGS. 2 and 4 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or electro-magnetic waves, such as those generated during radio wave and infrared data communications, and the like.

With reference to FIG. 1, a functional block diagram of a computer system 100 is shown. The computer system 100 may be a PC, such as a desktop, a laptop, palmtop computer, portable digital assistant (PDA), server computer, cellular telephone, pager, or other computing device capable of executing instructions for performing the exemplary method. The computer system 100 may be further embodied in a networked image forming apparatus, although it is also contemplated that the system may be located elsewhere on a network to which the image forming apparatus is connected, such as on a server, networked computer, or the like, or distributed throughout the network or otherwise accessible thereto. The network interface allows the computer to communicate with other devices via a computer network, such as a local area network (LAN), a wide area network (WAN), or the internet, and may comprise a modulator/demodulator (MODEM).

The illustrated computer system 100 includes a controller 102 formed as part of at least one image forming apparatus for controlling an operation of at least one marking (or print) engine for forming the double-layer GlossMark™ image on print substrates. Alternatively, the controller 102 may be contained in a separate, remote device that is connected with the image forming apparatus. The instruction data may be output from the controller 102 for further print processing at the print engines. The controller 102 contains a processor 104, which controls the overall operation of the computer system 100 by execution of processing instructions which are stored in memory 106 connected to the processor 104. Computer system 100 also includes a network interface and a user input output interface 124. The I/O 124 interface may communicate with one or more of a display, for displaying information to users, and a user input device, such as a keyboard or touch or writable screen, for inputting instructions, and/or a cursor control device, such as a mouse, trackball, or the like, for communicating user input information and command selections to the processor. The various components of the computer 100 may be all connected by a bus 108. The processor 104 executes instructions for performing the method outlined in FIGS. 2 and 4.

The primary image data selection is processed by the processor 104 according to the instructions contained in the memory 106. The memory 106 stores a gloss font element representation component 110, which provides a font representation, a patternink creation component 112, which provides a patternink, and a double layer GlossMark™ image creation component 114, which provides a second variable text string overlaid on the first layer and through the patternink. These components 110-114 will be later described with reference to the method. The data undergoes processing according to the various components for generating a print instruction, which is stored in the data memory 116.

The memory 106 stores instructions for performing the exemplary method as well as the processed data. The memory 106 may represent any type of tangible computer readable medium such as random access memory (RAM), read only memory (ROM), magnetic disk or tape, optical disk, flash memory, or holographic memory. In one embodiment, the memory 106 comprises a combination of random access memory and read only memory. In some embodiments, the processor 104 and memory 106 may be combined in a single chip.

FIG. 1 further illustrates the computer system 100 connected to a primary image source 118 for inputting and/or receiving a primary image 120 in electronic format. The primary image source 118 may include an image capture device, such as a scanner, a computer, or the like. The primary image source 118 is in communication with the controller 102 containing the processor 104 and memories 106, 116.

In another embodiment, the primary image data 120 may be input from any suitable image source 118 such as a workstation, a database, a memory storage device, such as a disk, or the like. Typically, each input digital image includes image data for an array of pixels forming the image. The image data may include colorant values, such as grayscale values, for each set of color separations, such as $L^*a^*b$ or RGB, or be expressed in another color space in which different colors can be represented. In general, "grayscale" refers to the optical density value of any single image data channel, however expressed (e.g., $L^*a^*b$, RGB, YCbCr, etc.). The images may be photographs, video images, combined images which include photographs along with text, and/or graphics, or the like. The images may be received in JPEG, GIF, JBIG, BMP, TIFF or other common file format used for images and which may be converted to another format such as CMYK colorant values prior to processing. Input images may be stored in the data memory during processing.

An image forming apparatus, as used herein, can include any device for rendering an image on print media, such as a laser printer, bookmaking machine, or a multifunction machine having copying and/or faxing as well as printing capability. "Print media" can be a physical sheet of paper, plastic, or other suitable physical print media substrate for images. A "print job" or "document" is normally a set of related sheets, usually one or more collated copy sets copied from a set of original print job sheets or electronic document page images, from a particular user, or otherwise related. An image generally may include information in electronic form which is to be rendered on the print media by the image forming apparatus and may include text, graphics, pictures, and the like. The operation of applying images to print media, for example, graphics, text, photographs, etc., is generally referred to herein as printing or marking. While in the exemplary embodiment, the image forming apparatus is described in terms of a xerographic printer, it is also contemplated that the image forming apparatus may incorporate inkjet or other marking technology.

With continued reference to FIG. 1, the image forming apparatus includes a marking engine 122. A pigmented toner applying component, such as a cartridge, supplies for applying to a substrate passing through the marking engine 122. The marking engine 122 includes many of the hardware elements employed in the creation of desired images by electrophotographical processes. In the case of a xerographic device, the marking engine typically includes a charge retentive surface, such as a rotating photoreceptor in the form of a belt or drum. The images are created on a surface of the photoreceptor. Disposed at various points around the circumference of the photoreceptor are xerographic subsystems which include a cleaning device, a charging station to be applied (four in the case of a CMYK printer), such as a charging corotron, an exposure station, which forms a latent image on the photoreceptor, a developer unit, associated with each charging station, for developing the latent image formed on the surface of the photoreceptor by applying a toner to obtain a toner image, a transferring unit, such as a transfer corotron, for transferring the toner image thus formed to the surface of a print media substrate, and a fuser, which fuses the image to the substrate. The fuser generally applies at least one of heat and pressure to the sheet to physically attach the toner.

FIG. 2 illustrates an overview of the method embodiments according to the disclosure. The method for providing a double layer of variable gloss text strings starts at S200. A GlossMark™ font representation is retrieved at S202. This font representation provides font elements that may be used in series to form a text string. Simultaneously, this font representation uses an anisotropic structure to distinguish character foreground from background. A first text string is rendered with the aid of the GlossMark™ font into a patternink structure at S204, where the defining property is that the patternink structure will serve as a mask for later rendering of other variable data. It is understood that the created patternink mask has a finite size and can be mapped to a complete page by cropping or replicating, where replication is the more likely and preferred scenario.

A second variable text string is rendered through the patternink mask at S206 where said second string is visible to a human as a change in color between character foreground and background. In a preferred embodiment, the patternink definition will have sufficient size and position information so that both variable data strings overlay in the intended manner. In an alternate embodiment, the first variable text string layer will have a non-specifically designed location and will use system defaults.

When rendering the second layer variable data test string through the patternink mask incorporating an instantiation of the first variable text string, the second layer string should be rendered with two color informations or colorant mixtures; namely, the color information for the foreground and, non-optionally, the color information for the background. The method ends at S208.

Figure 3:
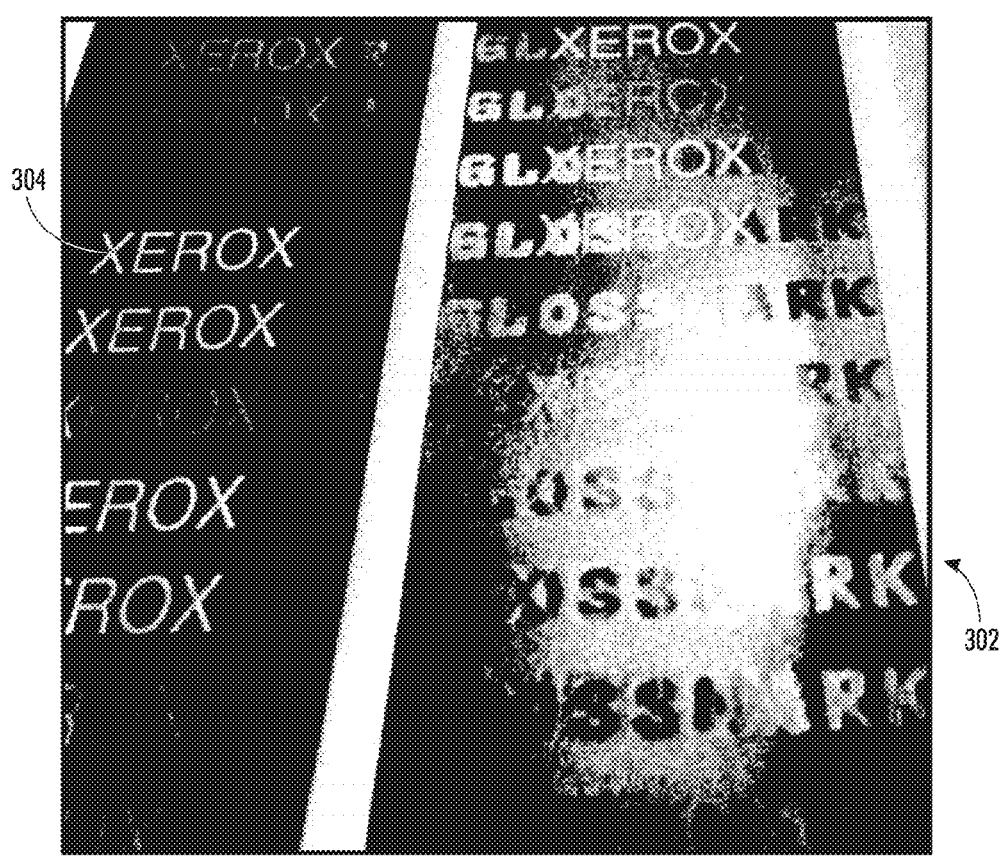
FIG. 3 is an exemplary embodiment of a double layer GlossMark™ text on a substrate including a first layer of gloss and a second layer of visible variable data each being discernable relative to different viewing angles.

FIG. 3 shows a resulting document provided by the method discussed in FIG. 2. FIG. 3 illustrates a side-by-side comparison of the same document relative to different viewing angles. The first text string 302 rendered with the aid of the GlossMark™ font is shown as including the term "GLOSSMARK" and the second layer variable data text string 304 rendered with conventional font is shown as including the term "XEROX". As illustrated, the first and second text strings 302, 304 are shown as tiles of repeating text strings. The first text string 302 is the more discernable text/image when the document is viewed relative to a first angle and the second text string 304 is the more discernable text/image when the document is viewed relative to a second angle.

FIG. 4 shows the method according to the present disclosure in more specific detail. The method starts at S400. A GlossMark™ font representation is retrieved at S402. This font can be retrieved as an encapsulated font, such as, for example, a type 3 PostScript™ font that includes a background field area outer boundary into which a first anisotropic pattern is toggled while a second anisotropic pattern is toggled into a font character body shape in accordance with the bitmap provided by a binary raster input font symbol.

With continued reference to FIG. 4, the method further includes rendering the first variable layer text string into a patternink at S404. As mentioned, it is contemplated that the retrieved GlossMark™ font can be used to define a "tile" of repeating text string(s). A user can define a "tile" of GlossMark™ text for forming the patternink. This patternink can be previously designed with static characteristics. Alternatively, the patternink may be dynamically designed in conjunction with the processing of a corresponding print job. Both previously and dynamically-designed pattherninks can also incorporate variable data associated with the print job.

An exemplary embodiment of a dynamic ink that includes an instruction for a variable data text string and, more specifically for the example string "XEROX!", may be created using the following exemplary PostScript pseudo-code:

```
/GlossFont /NeueClassic-GL-24 def
/GlossFontsize 28.8 def
/GlossFontstring (XEROX!) def
%% this sets the Font parameters.
    /PatternType 1
%% tiling properties can be defined similar to Holladay dots
    /BBox [xstart ystart xend yend ]
    /XStep GlossFontstring stringwidth pop
    /YStep smallfontsize
%% geometric values for the tiling rectangle
    /PaintProc
    { xstart ystart moveto GlossFontstring show
    }
%% this creates the variable data string defined through GlossFontstring
matrix makepattern
/GlossTextPaint exch def
%% identifying the patterns as GlossTextPaint
grestore
```

To render the GlossMark™ font within a selectively bounded area, the system identifies an outline of the bounded area, computes the bounding box, and computes a matching text string for the bounding box.

Figure 5A:
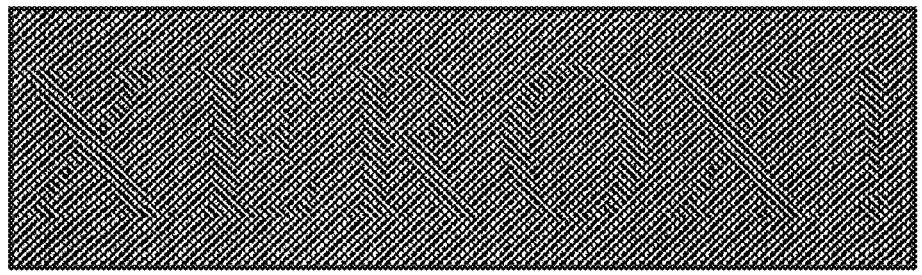
FIG. 5A shows a first layer variable data text string formed with a series of GlossMark™ font elements.

FIG. 5A shows the exemplary pattern ink created by the PostSript pseudo-code listed above. The string "XEROX!" can be traced as the texture change of the anisotropic structure for this pattern ink. In this example, the patternink is available as a "color" or "ink" selection for subsequent PostScript drawing commands. Note that the geometry and size of the pattern may be characterized as a fixed portion of the pattern ink. In the example, the geometry and size of the pattern is created in the first step of the pseudo code. In one embodiment, a pattern ink used for tiling is defined with desired start and end coordinate information for a first text string (xstart, xend), (ystart, yend) included in the command data.

More specifically and with continued reference to FIG. 4, a variable portion of the patternink is defined in a PDL at S406. A fixed portion of the patternink is defined in the PDL at S408 and is based on the variable input. It is the geometry of this fixed portion that defines the tiling across the page. In one embodiment, an image may be received at the DFE through an input source, such as a scanner. Next, a bounding shape for the patternink is defined in the PDL at S410. A procedure for painting the variable and fixed portions within the bounding shape is defined in the PDL at S412. In one embodiment, the patternink defined in S406, S408 is at least temporarily saved to a storage device at S414. The storage device may be associated with an image forming apparatus and may be accessible to a print controller for processing the print job and communicating a corresponding bitmap representation of the print job to a print engine. The variable portion of the patternink may be based at least in part on variable data associated with the print job. At least one object within the print job may identify the patternink for a color parameter. In one embodiment, PostScript may be used as the PDL. In other embodiments, any other PDL (e.g., intelligent printer data stream (IPDS), personal printer data stream (PPDS), portable document format (PDF), printer command language (PCL), extensible markup language (XML), etc.) may be used.

Following a creation of the patternink described in S404, variable data that is intended to be shown as gloss is rendered into a dynamic patternink construct. The mask encapsulates the first variable data entity in a specific typeface and size, but it may not yet have any color poured through it or color attribute attached to it. However, the patternink includes a position variable xstart, xend coordinate that provides for rendering the patternink at the arbitrary location on a print media substrate.

With continued reference to FIG. 4, the system uses the identified bounding box and text string information to render the patternink structure to a print media substrate with a color. In other words, a color pattern is created using a constant color or constant color pattern. The system is adapted to render the patternink using one color by providing on the substrate the foreground of each font element of the text string in the first anisotropic orientation and the background of each font element of the text string in the second anisotropic orientation (S416). As mentioned, FIG. 5A illustrates the first layer text string including the term "XEROX!" used with GlossMark™ font to create the patternink. As illustrated in FIG. 5A, the font elements (i.e., letters) forming the term "XEROX!" are rendered in the first anisotropic orientation and the background bounding box is rendered in the second anisotropic orientation. As earlier mentioned, the screen comprises a grid of cells (pixels) for each dot location which may be on or off. The anisotropic orientations are determined by the "on" pixels relative to the "off" pixels. The patternink that is formed in this exemplary illustration is next used as a mask for rendering other variable data.

With continued reference to FIG. 4, a second layer variable data text string is rendered through the patternink mask at S420. One aspect of the present disclosure is that the patternink formed at S402 provides the structure that the second layer variable data text string is rendered through. Therefore, the color(s) used for rendering the second layer variable text string may be only applied to the white spaces formed in the patternink at S402. Accordingly, the system determines the pixels of the patternink mask where the color used to provide the first layer variable text string is "off" at S422.

Figure 5B:
FIG. 5B shows a second layer variable data text string formed with a series of color font elements.

With continued reference to FIG. 4, the second layer variable data text string is rendered using two color informations or mixtures for the foreground and the background. These two color informations or mixtures are different from the color used for rendering the first layer variable data text string at S402. FIG. 5B illustrates an exemplary second layer variable data text string including the term "Layer 2", wherein the foreground defining the font elements are shown in one color and the background surrounding the font elements are shown in the color white. In this manner, two brushes of toner/ink are used to render the second layer: a first color (or mixture) for the background and a second (color or mixture) for the foreground. The colors forming the second layer variable data text string are applied through the patternink/mask at S424 to the white/"off" portions and, more specifically, to the same bounded area identified in S404, where the polarity can be defined freely, but has to be consistent for the two renderings.

Figure 5C:
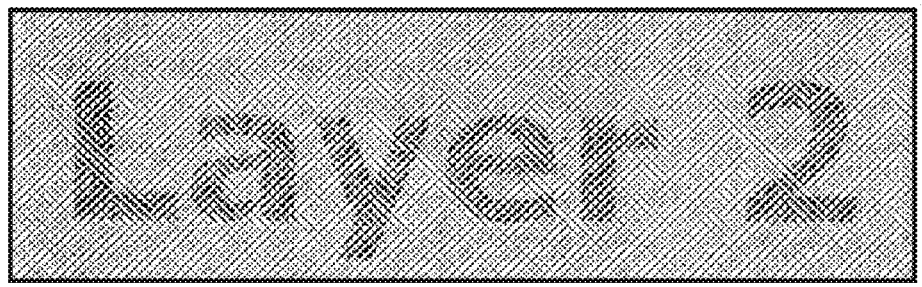
FIG. 5C shows a double-layer GlossMark™ image including the second layer of FIG. 5B superimposed over the first layer of FIG. 5A.

FIG. 5C illustrates the double layer GlossMark™ image as including the first layer "XEROX!" being visible as gloss through its anisotropic structure and the second layer "Layer 2" being visible as color. The method ends at S426.

Although the control methods are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system, wherein the disclosure is not limited to the specific applications and embodiments illustrated and described herein.

One aspect of the method and apparatus described herein is an ability to create fully variable graphics objects that encapsulate specialty imaging effects. This was previously only possible for static images. The variable data capability for the pattern ink scenario outweighs any limitations on design variations.

The teachings discussed herein is not limited to GlossMark™ applications, but may rather be embodied in double layer Correlation Mark text. Furthermore, a tool assist, such as an illuminant, is contemplated for making viewable the alternate messages. In the GlossMark™ image, viewing angle makes viewable the second message.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for providing a double layer gloss image, the method comprising:
   using a processor, providing a first layer text string for generating a patternink, the providing the first layer text string includes:
      retrieving a gloss font including a first anisotropic structure assigned to the first character field and a second anisotropic structure different from the first anisotropic structure assigned to the first background field such that both of the first and second anisotropic structures are encapsulated as a single entry in a font reference, and
      forming the first layer text string as a series of the gloss font elements; and,
   using the processor, providing a second layer text string through the patternink;
   wherein the first layer text string is visible as gloss variation between the first character and background fields and the second layer text string is visible as a color difference between second character and background fields.

2. A method according to claim 1 further comprising:
   retrieving the gloss font element including the font character shape and a background field;
   using the series of the gloss font elements to form the first layer text string;
   defining a tile of the first layer text string as the patternink.

3. A method according to claim 1 further comprising:
   defining variable start position coordinates for generating the patternink at an arbitrary position on an associated media substrate.

4. A method according to claim 1, wherein the generating the patternink includes:
   defining a variable portion of the patternink;
   defining a fixed portion of the patternink based on the variable input;
   defining a bounding shape for the pattern;
   defining a procedure for painting the variable and fixed portions within the bounding shape; and temporarily saving to a storage space the defined patternink.

5. A method according to claim 4 further comprising providing the second layer text string within the bounding shape.

6. A method according to claim 1, wherein the providing the second layer text string includes:
   identifying on-pixels and off-pixels assigned to the first layer text string;
   assigning a color attribute for the second layer text string to the identified off-pixels.

7. A computer product comprising a tangible medium encoding instructions which, when executed, perform the method of claim 1.

8. A method for forming a double-layer gloss image, the method comprising:
   defining a patternink to include a first variable gloss layer data text string;
   defining start position coordinates for rendering the patternink at an arbitrary location on an associated print media substrate; and,
   using the patternink as a functional mask for pouring a second color layer text string through the mask.

9. A method according to claim 8 further including writing a variable text string through the mask using the same coordinates, the variable text string replacing the off-pixels included in the image data for the first variable gloss layer data text string.

10. A method according to claim 8, wherein the first variable gloss layer data text string is formed by a series of font elements having a foreground field assigned a first anisotropic structure orientation and a background field assigned a second, rotated anisotropic structure orientation.

11. A method according to claim 8, wherein the second color layer is formed from a series of second font elements having a foreground field assigned a first color and a background field assigned a second, different color.

12. A method according to claim 8, wherein the defining the patternink includes:
   defining a variable portion of the patternink in a PDL;
   defining a fixed portion of the color space in PDL based on the variable input, the fixed portion defines a tiling across an associated print media sheet;
   defining a bounding shape for the pattern in PDL;
   defining in PDL a procedure for painting the variable and fixed portions within the bounding shape; and,
   temporarily saving to a storage space the defined patternink.

13. An apparatus adapted to render a double layer gloss image, the apparatus comprising:
   a processor adapted to:
      retrieve a gloss font representation;
      generate a first text string using a series of gloss fonts of the retrieved font representation;
      generate a patternink using the first text string for forming a first gloss layer;
      generate a second text string using a series of color fonts; and
      write a second color layer over the first gloss layer by providing the second text string through the patternink;
   a memory for saving the patternink; and,
   a marking engine adapted to render the first gloss layer and the second color layer onto an associated print media substrate.

14. An apparatus according to claim 13, wherein the patternink includes coordinate information for providing a position for each of the first and second layers.

15. An apparatus according to claim 13, wherein the second color layer is provided through the patternink only at pixel locations that are off for the first gloss layer.

16. An apparatus according to claim 15, wherein the first gloss layer is formed from a constant color rendered at multiple anisotropic structure orientations.

17. An apparatus according to claim 13, wherein the second color layer is formed from a tile of the second text string, the second text string being formed from conventional font having a first color foreground field and a second color background field, the first color being different from the second color.

* * * * *